United States Patent

[11] 3,558,877

[72] Inventor Jerome Pressman
Lexington, Mass.
[21] Appl. No. 602,855
[22] Filed Dec. 19, 1966
[45] Patented Jan. 26, 1971
[73] Assignee GCA Corporation
Bedford, Mass.
a corporation of Delaware

[54] METHOD AND APPARATUS FOR MASS SEPARATION BY SELECTIVE LIGHT ABSORPTION
10 Claims, 6 Drawing Figs.

[52] U.S. Cl. .................................................... 250/41.9,
250/43.5, 331/94.5
[51] Int. Cl. .................................................... H01j 39/34
[50] Field of Search ........................................... 250/41.9(G),
41.9ISE, 43.5; 331/94.5

[56] References Cited
UNITED STATES PATENTS
3,360,733 12/1967 Vali et al. ..................... 328/233
2,836,750 5/1958 Weimer .......................... 250/41.9

OTHER REFERENCES
"The Reflection of Electrons From Standing Light Waves", P. L. Kapitza, CAMBRIDGE PHILOSOPHICAL SOCIETY PROCEEDINGS, May 1, 1933.
Journal of the Optical Society of America, Vol. 49, No. 4, April 1959, pp. 338–340 "Photoionization Analysis by Mass Spectroscopy" by Weissler et al.

Primary Examiner—Archie R. Borchelt
Assistant Examiner—A. L. Birch
Attorney—Kenway, Jenney & Hildreth ABSTRACT: A method of separating isotopes one of which selectively absorbs light of a predetermined wavelength comprising directing a beam of light across a gaseous beam comprising a mixture of the isotopes to deflect the selectively absorbing species, and collecting the deflected species. Apparatus comprising an evacuable chamber, in which there is a molecular beam source of particles including particles selectively absorbing light at a given wavelength and other particles that do not absorb light at that wavelength, means for directing a beam of light across the beam, and collecting means disposed to collect the species separated by the beam.

PATENTED JAN 26 1971

*INVENTOR.*
JEROME PRESSMAN
BY
Kenway, Jenney & Hildreth
ATTORNEYS

PATENTED JAN 26 1971

*INVENTOR.*
JEROME PRESSMAN

BY Kenway, Jenney & Hildreth

ATTORNEYS

METHOD AND APPARATUS FOR MASS SEPARATION BY SELECTIVE LIGHT ABSORPTION

My invention relates to mass separation, and particularly to a novel method and apparatus for separating mixtures that may be chemically homogenous into their several constituents.

Although my invention is applicable to the separation of essentially any two substances, it is particularly applicable to the separation of isotopes of the same element which are extremely difficult to separate by any other means. Prior to my invention, so far as I am aware, the most closely related technique known for the separation of isotopes made use of a photochemically accelerated reaction. For this purpose, it is necessary to discover a photochemically accelerated reaction which the element comprising the isotopes will undergo. The isotopes are then excited optically with light selectively absorbed by one isotope, in the presence of other reactants needed in the process, such that the excited isotope exhibits a higher reaction rate than the nonexcited isotope. The reaction products are then chemically separated, and used as enriched sources of the isotopes. Such reactions have been investigated for mercury, atomic oxygen, and zinc. However, in general the search for compounds that will react with an element in the photochemically excited state, but not in the ground state, is at best an arduous task, and may prove fruitless. Thus, the method is not generally applicable to the separation of isotopes. In addition, it is apparent that the economics of separation by that technique are inherently limited by the cost of the reactants and of the energy that may be required, both in the isotope separating reaction, and the additional reaction or reactions that must be carried out with the enriched reaction products to recover the desired isotopes. A primary object of my invention is to facilitate the separation of mixtures of isotopes, and other difficulty separable mixtures, with a minimum exchange of energy and without a chemical reaction.

Briefly, the above and other objects of my invention are attained by effecting a controlled contact between a stream of a mixture of particles to be separated and a beam of light of restricted bandwidth that is selectively absorbed by one of the particles to be separated from the others. The separated particles may be atoms, molecules, or fragments or atoms or molecules, whether charged or uncharged, so long as they comprise one species that will, and one that will not, absorb light at some wavelength.

In accordance with one embodiment of my invention, a beam of highly monochromatic light at a frequency absorbed by one isotope is simply directed across a beam of a mixture of isotopes including the selectively absorbing one and another or others. The photons absorbed by the selected isotope contribute momentum to the absorbing atoms in the direction of the axis of propagation of the beam. No average momentum in this sense if contributed to the other isotopic particles. Two divergent particle beams are thus produced, each enriched in a different isotope with respect to the original stream. The enriched beams can be collected in any conventional manner, and the separated isotopes thereby recovered.

In accordance with the second embodiment of my invention, a beam of particles to be separated is produced and transverse to this beam is formed a standing wave of light at a highly restricted frequency selectively absorbed by one of the particles to be separated from the others. Separation in this case is effected by Bragg reflection of the light-absorbing particles from the standing wave in a manner analogous to that in which light is reflected from a grating. As in the first embodiment, two beams are thus formed by the reflected and nonreflected streams of atoms, and they can be collected by conventional techniques.

The preferred mode of carrying out my invention, and the details of the construction of preferred forms of the apparatus of my invention, will best be understood in the light of the following detailed description, together with the accompanying drawings, of various illustrative embodiments thereof.

In FIG. 1a, I have shown a graph of absorption coefficient $k$ against wavelength $\lambda$ for two isotopes identifies as I and II. As illustrated, each isotope exhibits a maximum value of $k$ at a different wavelength, and this behavior is characteristic of most isotopes. In the atomic form, it may be that there are overlapping isotopic absorption profiles, but in general in the molecular state the regions of selective absorption will be more widely separated for the different isotopes. As my invention is applicable to either atoms or molecules, the form in which the isotopes are put for separation can be selected on the basis of the separation between the absorption spectra as one consideration.

FIG. 1b illustrates the emission intensity characteristics of a source of light as a function of wavelength. The illustrated source would be an efficient one for the separation of the isotope I from the isotope II shown in FIG. 1a. In general, the absorption lines are relatively close together, such that the bandwidth of the source must be quite narrow. The manner in which a suitable source can be constructed will be described in more detail below.

Figure 1:
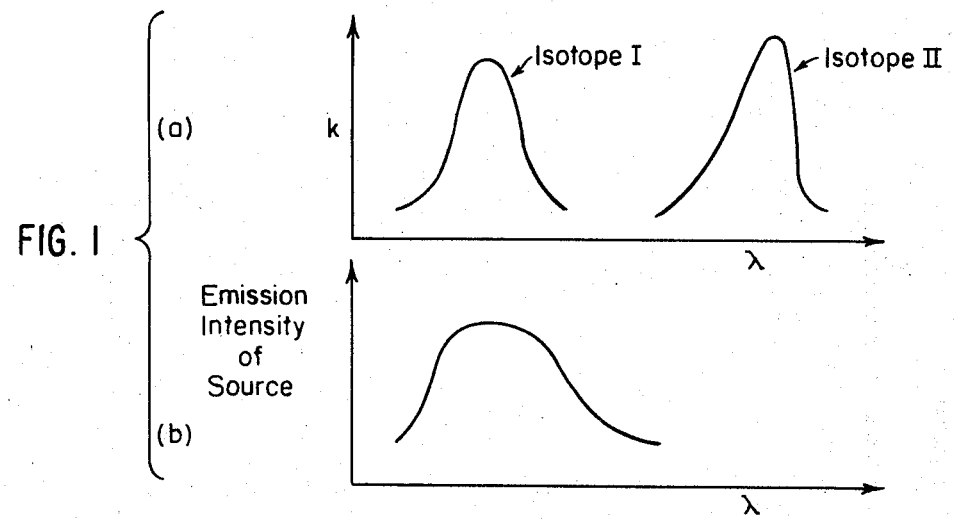
FIGS. 1a and 1b are graphs relating the absorption coefficient of two isotopes as a function of wavelength with the emission intensity of a source of light as a function of wavelength.
Figure 2:
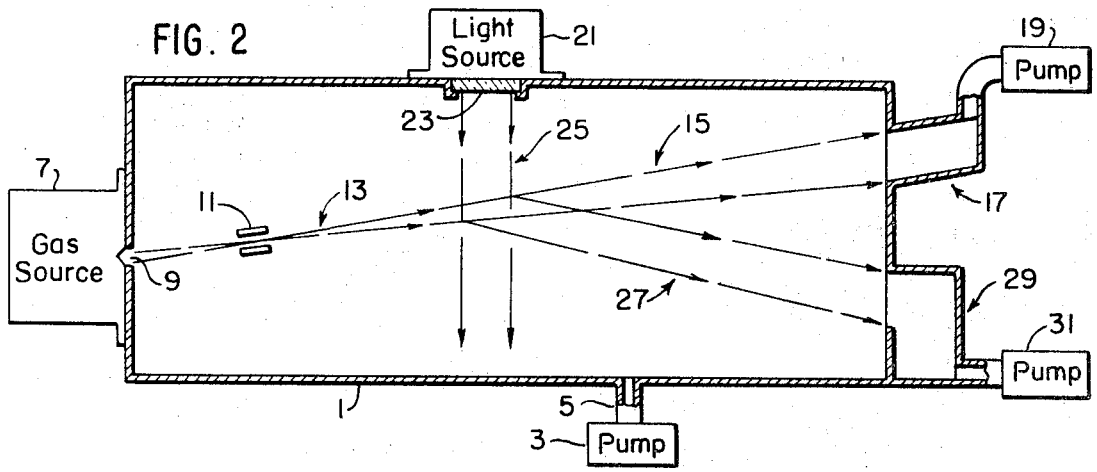
FIG. 2 is a schematic view of apparatus in accordance with one embodiment of my invention, with parts shown in cross section and parts broken away.

Referring next to FIG. 2, I have illustrated one form of apparatus for separating isotopes such as those having the characteristics illustrated in FIG. 1a. The apparatus comprises a suitable gastight evacuable chamber 1, which may be reduced to a suitable low pressure by a conventional vacuum pump 3 connected thereto through a conduit 5. The pump 3 may incorporate a suitable forepump between the high vacuum pump and the atmosphere if desired, as determined by the required pressure in the housing 1 based on considerations discussed below.

A suitable gas source 7 having an outlet port in registry with a port 9 formed in the wall of the housing 1 is connected to the housing to supply a beam of particles to be separated. These particles may be in the form of atoms, ions, molecules, or fragments thereof. The source 7 may comprise a conventional molecular beam source such as a thermal evaporator, a thermal effuser, a laser evaporator, an ion-sputtering device, an electron-sputtering device, or the like. As will be described in more detail below, it may also comprise a supersonic nozzle.

As indicated at 11, conventional slits are preferably provided in the housing 1 to confine the beam of particles 13 emerging from the source 7 and prevent lateral spreading that would decrease the efficiency of the separation process. The beam 13 is directed toward, and undeflected particles 15 in the beam continue toward, a collection chamber 17 formed in the end wall of the housing 11. The chamber 17 may comprise a conventional trap for collecting the undeflected beam particles in the beam 15, and is preferably connected to a suitable exhaust pump 19. The pump 19 may also comprise a conventional vacuum pump.

A monochromatic light source 21 is connected to the housing 1, in communication with a window 23 of optically transparent material such as glass or the like in the wall of the housing. The light is limited, in a manner to be described below, to a frequency that will be selectively absorbed by one of the isotopes in the beam 13. As will appear, these light-absorbing isotopes will receive a momentum contribution in the sense of the direction of propagation of the beam 25 from the light source 21, and will accordingly form a deflected beam 27 that will be highly enriched in the selectively absorbing isotope. This beam may be collected in a trap comprising a collection chamber 29 formed in the end wall of the housing, and communicating with an exhaust pump 31. Collection may be by condensation or vapor deposition of the enriched streams 15 and 27 on suitable plates, may be accomplished by filters in the lines controlled by the pumps 19 and 31, or may take other forms known to those skilled in the art.

The mechanism by which isotope separation is effected by the apparatus of FIG. 2 will next be considered. First, it is essential that the light source 21 have a frequency appropriate for absorption by the intended isotope and be sufficiently narrow in bandwidth so that the source line does not substantially overlap the absorption line of more than one isotope. Such a light source may be formed in any one of several known ways, depending upon the wavelength and power desired. One such source is in the form of a monoisotopic lamp, comprising a thermally excited mass of a single isotopic individual. Atomic beam resonance lamps are also useful. Such a resonance lamp will in general produce light at a number of frequencies. In order to separate the desired frequency, a negative filter cell can be employed. Such a filter cell can be made in the form of a transparent chamber, in the path of the beam from the resonance lamp, containing in gaseous form all of the isotopes of the element to be separated except that one which it is desired to separate. The isotopes in the filter cell will absorb substantially all of the light at the frequencies other than those selectively absorbed by the desired isotope.

A preferred form of light source for most purposes is the optical laser. Such a laser may be made with a resonant cavity containing the isotope to be separated, or it may be made in the form of a ruby, neodymium or carbon dioxide laser followed by apparatus for shifting and tuning the output to the desired spectral line. A number of linear and nonlinear phenomena are known by which the desired shifting and tuning can be effected. For example, temperature effects, or the generation of harmonics may be sufficient to produce the desired band. Zeeman, Fabry-Perot or Raman interferometry may likewise be used to produce a selected line. The exact nature of the lamp used to produce the selected illumination forms no part of my invention, and, as suitable sources are well known in the art, they will not be further described.

The apparatus of FIG. 2, and the method of separation performed thereby depends on contributing momentum to the selectively absorbing particle in a preferred direction. Momentum is contributed by the collision of a photon in the light beam 25 in FIG. 2 with an absorbing particle in the beam 13. The momentum $P_m$ of a photon is given by (1) $$P_m = \frac{E}{c} = \frac{h\nu}{c},$$

where $P_m$ is the momentum of the photon in gram centimeters per second, E is the energy of the photon in ergs, c is the velocity of light in centimeters per second, $\gamma$ is the frequency of the photon in cycles per second, and h is Planck's constant in erg seconds. For a 2-electron volt photon, $P_m$ is approximately equal to $10^{-22}$ gram centimeters per second.

Assume that the particles in the beam 13 of FIG. 2 have a specific molecular weight M, relative to the molecular weight of a proton. Upon absorption of a photon from the beam 25 in FIG. 2, the momentum $P_m$ given by the equation above and contributed to the particle will result in a change in velocity $\Delta V$ given by (2) $$\Delta V = \frac{P_m}{M m_a} = \frac{10^{-22}}{M m_a} \cong \frac{10^2}{M} \text{ cm./sec.,}$$

where $m_a$ is the mass of a proton.

For N such absorptions by a given particle, the total velocity increment $\Delta V_n$ will be $N \Delta V$, or (3) $$\Delta V_n = \frac{N \times 10^2}{M} \text{ cm./sec. for 2 e.v. photons.}$$

In the case of many atoms, the average time between collisions with photons is extremely short; i.e., typically $10^{-7}$ to $10^{-8}$ seconds, so that N may be very large. In general, the atoms absorbing photons will also emit photons, and each emission will cause a change of momentum. However, while the momentum contributions to the particles in the beam 13 by the photons in the beam 25 are directional, the emissions of photons by the atoms in the beam are isotropic; that is to say, the probability that a photon will be emitted in a given direction will be the same as the probability that it will be emitted in any other direction. Accordingly, the net contribution of momentum to the particles of the beam by photon emissions is zero for N large. Thus, equation (3) above is a valid expression of the net effect on the velocity of the absorbing particles in the beam 13.

As an indication of the efficiency of the separation attainable by the method and apparatus of my invention, assume that the gas source 7 comprises an oven producing a molecular beam by thermal effusion. Assuming that the beam 13 from such a source has a resultant velocity V in the direction of the trap 17, the beam 13 will also have a thermal velocity component $V_t$ normal to to V and given by (4) $$V_t = \sqrt{\frac{3kT}{Mma}} = \left(\sqrt{\frac{3k}{Ma}}\right)\left(\sqrt{\frac{T}{M}}\right) \cong 1.7 \times 10^4 \sqrt{\frac{T}{M}}$$

where T is the temperature in degrees Kelvin and the other variables are as defined above.

The thermal component will effect a spreading of the beam that will cause a certain number of nonphoton absorbing constituents to appear in the trap 29. To evaluate the magnitude of this effect, let $R_r$ be the ratio of velocity from Equations (3) and (4) above. $R_r$ is given by (5) $$R_v = \frac{\Delta V_n}{V_T} = \frac{N \times 10^2}{M \times 1.7} \times 10^4 \sqrt{\frac{M}{T}} = \frac{6 \times 10^{-3} N}{\sqrt{TM}}$$

From (5), when $N = 1.6 \times 10^2 \sqrt{TM}$, $R_v = 1$ and when $N = 6.4 \times 10^2 \sqrt{TM}$, $R_v = 4$ For example, for Lithium (6) at room temperature, the photon created velocity equals the thermal velocity for $6.7 \times 10^3$ absorptions. Table I below shows other values of the number of absorptions necessary to give by recoil momentum a velocity equal to the thermal velocity as a function of molecular weight and temperature. It will be apparent that the separation is favored by a higher number of absorptions, a lower temperature, and lower molecular weight.

TABLE I.—MOLECULAR WEIGHT

[Number of Absorptions to give $R_v=1$; Number of Absorptions $\times 10^{-3}$]

| Temp., °K | microns | | | | | | | | |
|---|---|---|---|---|---|---|---|---|---|
| | 1 | 10 | 20 | 40 | 50 | 80 | 100 | 200 | 300 |
| 50 | 1.06 | 3.58 | 5.1 | 7.1 | 8.0 | 10 | 11 | 16 | 19.5 |
| 100 | 1.60 | 5.1 | 7.1 | 10 | 11 | 14 | 16 | 22 | 2 |
| 150 | 1.96 | 6.2 | 8.7 | 12.4 | 14 | 19.5 | 19.5 | 27 | 34 |
| 200 | 2.26 | 7.1 | 10 | 14 | 16 | 20 | 22 | 32 | 39 |
| 300 | 2.76 | 8.7 | 12.4 | 17.5 | 19.5 | 25 | 27 | 39 | 48 |
| 500 | 3.58 | 11.0 | 16 | 22 | 25 | 32.0 | 36 | 50 | 62 |
| 1,000 | 5.10 | 16.0 | 22 | 32 | 360 | 48 | 50 | 71 | 87 |

Assuming that the locus of effusion is a point, as approximated by the aperture 9 in FIG. 2, and the major lateral spread x of the beam 13 is given by < (7) $x = tV_t$, where $t$ is time, then for $V_N > V_t$ the desired isotope will have a greater concentration in the projected direction than in the naturally occurring direction. In somewhat more detail, the velocity distribution in the x direction can be written as (8) $$dN(V_x) = \frac{N}{\alpha \sqrt{\pi}} R^{\frac{-V_x^2}{\alpha 2}} dV_x$$

where $N(V_x)$ is that number of particles having the velocity $V_x$ in the x direction, $V_x$ is the velocity in the x direction, N is the total number of absorptions, and $\alpha$ is the most probable value of $V_x$.

The most probable speed, $\alpha$, can be written as
$\frac{1}{2}M\alpha = kT_g$, (where $V_t = 1.2 \alpha$) and $T_g$ is the temperature.

Below are given the fractions of atoms that have velocities equal to or exceeding integral multiples of the most probable speed $\alpha$ in one direction:

| SPEED | FRACTIONS |
|---|---|
| 1 $\alpha$ | .26 |
| 2 $\alpha$ | $3 \times 10^{-2}$ |
| 3 $\alpha$ | $2 \times 10^{-3}$ |
| 4 $\alpha$ | $1 \times 10^{-5}$ |

In other words, 26 out of 100 atoms will be thermally excited to a velocity equal to 1$\alpha$, 3 out of 100 will be thermally excited to a velocity equal to 2$\alpha$, and so on. It will be apparent that for $V_n$ = approximately $4\alpha$ = 3.3 $V_t$, only 1 out of $10^8$ nonabsorbing atoms can be present with the accelerated atoms. Thus, a single stage separation can effect practically unlimited enrichment subject to the limitation of overlap of the isotopic absorption factor.

For maximum efficiency of the separation process, there must be few or no interparticle collisions in the beam. Otherwise, the undesired isotopes will be pushed through collision and the separation will not be clear cut.

The criterion for no collisions in the beam 13 can be given as $n\sigma_c l = 1$,
where $n$ is the total concentration in atoms per cubic centimeter, $\sigma_c$ is the collision cross section in square centimeters and $l$ is the width of the beam in centimeters. With $l = 1$, and $\sigma_c = 10^{-16}$ square centimeters, the concentration $n$ is about $10^{+16}$ atoms per cubic centimeter, corresponding to a pressure on the order of $10^{-1}$ torr or 100 microns. It may be desirable under some conditions to operate under collision conditions, as when greater density is required and when relatively low fractionation factors are acceptable.

As an indication of the power required for the light source 21, the light absorbed is given by
$dI = \text{Ink}$
where I is the light source intensity, $n$ is the particle concentration per cm.³ and $k$ is the absorption coefficient per particle.

Typical of the numbers encountered are the values $n = 10^{+11}$ $k = 10^{-11}$, and $I = 10^{16}$ photons per millisecond = $10^{19}$ photons per second $\cong$ 1 watt. With these values in a millisecond interval there would be $10^5$ absorptions. For a lifetime of $10^{-8}$ seconds, this "system" is saturated, with the atoms receiving the maximum number of absorptions possible.

The maximum number of absorptions $N_{max}$ equals $\frac{\tau p}{\tau}$
where Y p equals the light pulse time or exposure duration, and Y equals the optical lifetime. Similarly, the flux to obtain this maximum is the optimal value $F_o$, where $F_o$ equals $\frac{1}{k\tau}$, since $FYkn$ equals $n$.

For $F$ greater than $F_o$, presumably an $n$ greater than $\frac{1}{k}$ could be utilized and optical depths substantially greater than one could be processed. The precise calculations of the effects that would occur at high flux could be made, taking into account the effects of stimulated emission that would occur and the reshuffling effect occurring when absorbing atoms are moved away from the optical source to expose additional atoms to absorption and thereby increase the effective cross section.

The above analysis is concerned with atoms. For molecules, the absorption coefficients are much smaller (typically less than $10^{-16}$ cm.²), so that much larger amounts of gas can be processed before reaching the collision criterion. For molecules, short lifetimes of photons between collisions are still required, so that multiple photon absorption (large $n$) can occur in the irradiation time.

As indicated in FIG. 2, it is desirable that the light source be substantially normal to the direction of propagation of the beam 13 from the source 7. By that arrangement, the maximum separation is effected. The slits 11 help minimize the Doppler spread in the direction of propagation of the beam 25. This diminution can be calculated as $$\Delta V_S = 0.41 \frac{\Delta V_g}{h}.$$

Figure 3:
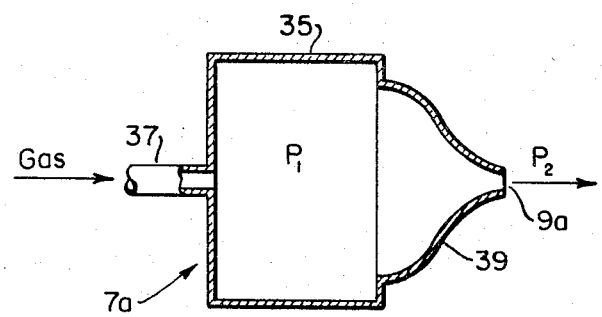
FIG. 3 is a schematic cross-sectional view of a gas source suitable for use in the apparatus of FIG. 2.

The control of the lateral velocity in this manner is of value not only for increasing the physical separation but also for separating out the isotopic optical spectra.

Where large flow rates are desired, it may be desirable to terminate the gas source 7 in a supersonic nozzle. FIG. 3 illustrates the basic construction required. Referring to FIG. 3, a gas source 7a comprises a plenum chamber 35, into which gas is introduced in any suitable manner, as through an entrance port 37. The plenum chamber 35 is terminated in a nozzle 39 having an exit 9a adapted to confront the aperture 9 in FIG. 2. The apparatus is arranged, as by adjustment of the pump 3 in FIG. 2, so that the ratio of the pressure P2 at the nozzle outlet to the pressure P1 in the plenum chamber 35 is the critical ratio for the isotopes to be separated. The exit velocity will then be equal to the speed of sound, giving a flow rate some 3 orders of magnitude greater than that attainable by furnace effusion. In addition, expansion of the gas through the nozzle 39 will reduce the temperature of the gas stream and thereby narrow the thermal velocity distribution.

Figure 4:
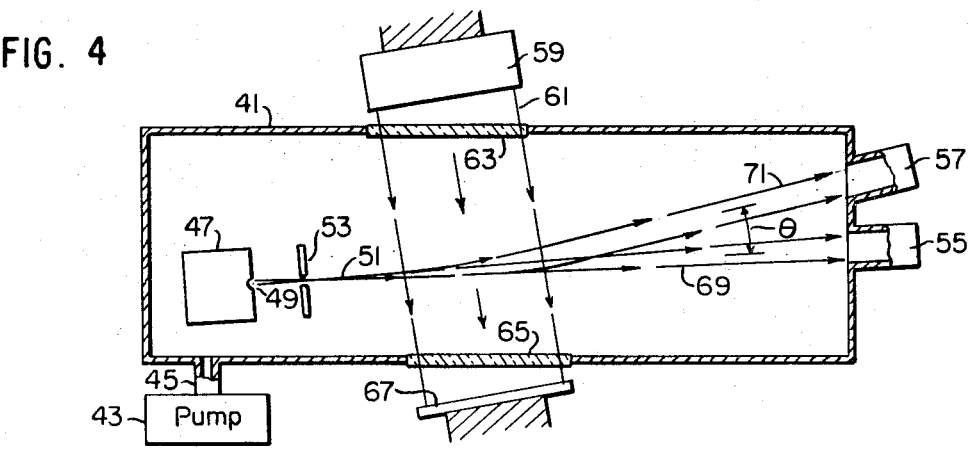
FIG. 4 is a schematic diagram, with parts shown in cross section and parts broken away, of a modification of the apparatus of my invention.

The process and apparatus just described depend upon the contribution of momentum by individual photons to selected particles of the stream to be separated. It is also possible to effect a separation by selective Bragg reflection from a standing optical wave. Referring to FIG. 4, the apparatus required may be generally the same as that discussed in connection with FIG. 2, except that the optical apparatus is modified to produce a standing light wave generally transverse to the path of propagation of the beam of particles to be separated. Specifically, the apparatus comprises a housing 41 adapted to be evacuated by a vacuum pump 43 connected to the housing by means of a conduit 45. A molecular beam source 47 is arranged in or otherwise communicating with the housing, and is provided with an aperture 49 emitting a molecular beam 51 of particles to be separated. While these particles could be molecules, atoms or fragments thereof, for purposes of illustration they will be described as atoms.

Suitable slits, as suggested at 53, may be placed in the path of the beam to reduce lateral spreading. As in the apparatus of FIG. 2, a collection trap 55 is arranged in the end of the housing 41 to receive undeviated particles in the beam 51, and a trap 57 is arranged to collect deviated particles reflected from the optical beam.

The optical beam is produced by a source 59, of any of the kinds described above, directing a beam of light 61 through windows 63 and 65 formed in the walls of the housing 41. The windows 63 and 65 may be of any conventional transparent material such as glass or the like. The beam 61 passing through the windows 63 and 65 is reflected from a mirror 67 back to the source 59. The source 59 and the mirror 67 are arranged and adjusted at a suitable distance so that reflections back and forth from the source to the mirror will reinforce. In order to make that possible, the mirror 67 may constitute the front mirror of an optical light laser comprising other elements located at 59, or the source 59 may be provided at its front surface with a half-silvered mirror that will allow light to be transmitted from the source 59 to the mirror 67 and light from the mirror 67 to be reflected back from the source 59. By any of the techniques discussed above, the light beam 61 is confined to a very narrow bandwidth and selected to be selectively absorbed by one of the species of particles in the beam 51.

By reflection from the standing pattern of the beam 61, in a manner analogous to the reflection from an optical grating, the beam 51 will be divided into a beam 69 of particles, which do not absorb light at the frequency of the source 59 and which are undeflected and thus passed to the collecting trap 55, and a beam 71 of atoms absorbing light at the frequency of the beam 61 and thereby reflected at such an angle that they will enter the collector 57. If desired, the collectors 55 and 57 may be provided with exhaust pumps, in a manner indicated in FIG. 2.

The mechanism of the separation process carried out by the apparatus of FIG. 1 involves stimulated emission from the particles in the beam 51 that will absorb photons at the frequency of the beam from the source 59. It has been known for some time that a standing wave light beam can reflect electrons in a fashion analogous to the reflection of light from a grating. Altschuler and others have recently shown that the process does not depend upon the characteristics of the electrons, but on the nature of the scattering process. In fact, atoms and molecules can also be scattered in an analogous fashion. My invention is based, first, on the concept that the reflection process involves stimulated emission by the reflected particles, and second, on the restriction of the standing wave to a frequency line selectively absorbed by one of the species of particles in the beam to be separated. Thus, the reflection process will only be effective on the selected species.

For electrons scattered from a standing optical wave, the Dirac-Kapitza analysis gives an expression for the scattering probability K per unit length for electrons traversing the region occupied by the standing waves;

$$K = \frac{4_2\pi^3 n^2 C^4}{\omega\gamma v}\frac{d\sigma(\pi)}{d\Omega}$$

where $n$ is the photon number density;
  $\omega$ is the angular frequency;
  $\gamma$ is the spectral width;
  $v$ is the electron velocity; and
  $\frac{d\sigma(\pi)}{d\Omega}$ is the Thomson scattering cross section for an electron.

The method and apparatus of my invention utilizes the resonant cross section, which is approximately $10^{-11} cm^2$ compared to the Thompson scattering cross section of $10^{-28} cm^2$.

For Rayleigh scattering ($\sigma = 10^{-28} cm^2$), kinetic energy = 1 electron volt, a power density of 1 meg watt per square centimeter, $\omega = \pi_x\ 10^{15} sec^{-1}$ and $v = 10^{-7} sec^{-1}$, K is of the order of 6. That means that the beam should be enormously effective in scattering the atomic species. With a resonance line, the cross section goes up by a factor of $10^{+14}$, and power requirements are considerably relaxed, so that low power is adequate, of the order of less than 1 watt for a scattering length of $10^{-3}$ centimeters. The Bragg angle $\theta_B$ between the beams 71 and 69 in FIG. 4, is given by $\theta_B = \hbar\omega/MCv$
With the constants given above, for a single stage separation as shown in FIG. 4, the angle $\theta_B$ would be equal to $2 \times 10^{-5}$ radians. While this angle is small, it supposes a single photon stimulated scattering process per particle and it can be extended in proportion to the number N of photon-stimulated scattering processes such that $\theta_B = N\hbar\omega/MCv$ and the scattering probability is proportional to the $2^{nth}$ power of the photon density, $n^{2N}$. A further increase in the net scattering angle may be attained by a series of reflections from successive standing wave cavities.

In the first process of my invention discussed above, the momentum and energy of the absorbing particles was changed. In the process carried out by the apparatus of FIG. 4, the energy of the atom is left unchanged while its momentum is changed by the amount $\frac{2h\nu}{c}$. This process is caused by stimulated emission, which does not occur or is minimized in the first process. Another characteristic difference is that the Bragg scattering taking place in the apparatus of FIG. 4 is proportional to the second power of the intensity of the light source, whereas in the first process the transfer of photon momentum is proportional only to the first power of the intensity.

Figure 5:
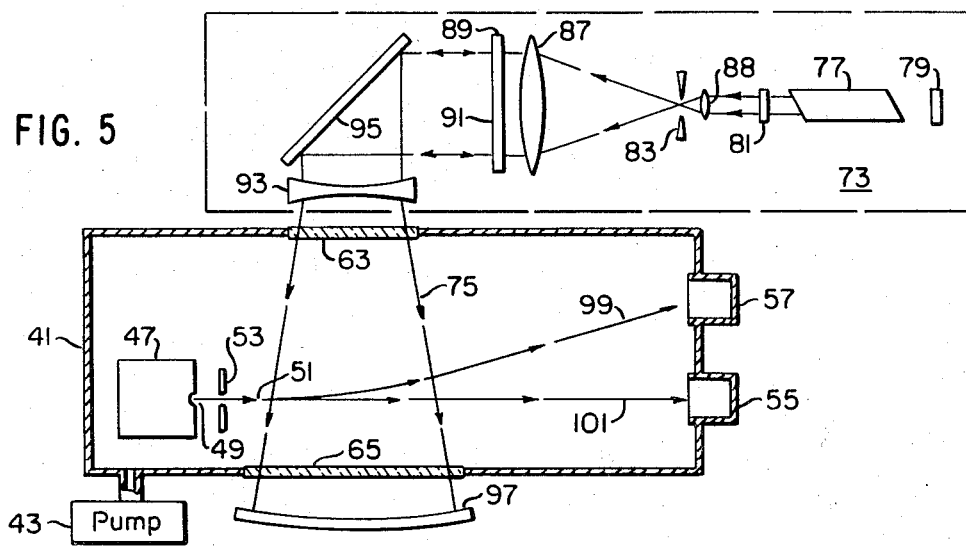
FIG. 5 is a diagrammatic sketch, with parts shown in cross section and parts broken away, of another modification of the apparatus of my invention.

FIG. 5 shows a modification of the apparatus of FIG. 4 by which an increased angular separation can be achieved. Parts corresponding to those shown in FIG. 4 are given corresponding reference numerals. The traps 55 and 57 are substantially the same as those shown in FIG. 4, except that for a given length of the housing 41 they would be spaced more widely, for reasons to appear.

The light source 73 in FIG. 5, corresponding to light source 59 in FIG. 4, is modified to produce a divergent beam of monochromatic light 75. For this purpose, various expedients could be employed but the apparatus shown and to be described is illustrative. Specifically, the light source 73 may comprise an optical laser having a resonant cavity 77, a back mirror 79, and a half silvered front mirror 81 in the conventional array for producing an intense beam of monochromatic light at a selected frequency by stimulated emission. Light emerging from the front mirror 81 is focused on an aperture in a plate 83 by a suitable lens 85, to simulate a point source. Light from the aperture plate 83 is collimated by a suitable lens schematically indicated at 87, and directed onto a half-silvered mirror 89. The mirror 89 is provided with a front surface 91 that is half-silvered. Light from the mirror 89 is directed through a divergent lens 93, as by a mirror 95. The divergent lens 93 produces a beam 75 that passes through the windows 63 and 65 in the housing 41 and falls on a curved mirror 97. The curvature of the mirror 97 is selected such that when the mirror is appropriately positioned with respect to the mirror 89, a standing wave will be produced.

The beam 75 comprising the standing wave is directed substantially transversely (at the Bragg angle) to the molecular beam 51 from the beam source 47. It will be apparent that as particles in the beam move from left to right in FIG. 5, the effective angle of the optical beam with respect to the molecular beam is increased, in such a manner that the Bragg scattering of the light absorbing particles in the beam will produce a continually increasing angle between the beam 99 of the absorbing particles and the beam 101 of nonabsorbing particles. Thus, a particle in the beam 51, if deflected to the angle $\theta$ in FIG. 4 at one position in the light beam, will be progressively reflected at greater and greater angles by successive absorptions as the particle moves to the right in FIG. 5.

Figure 6:
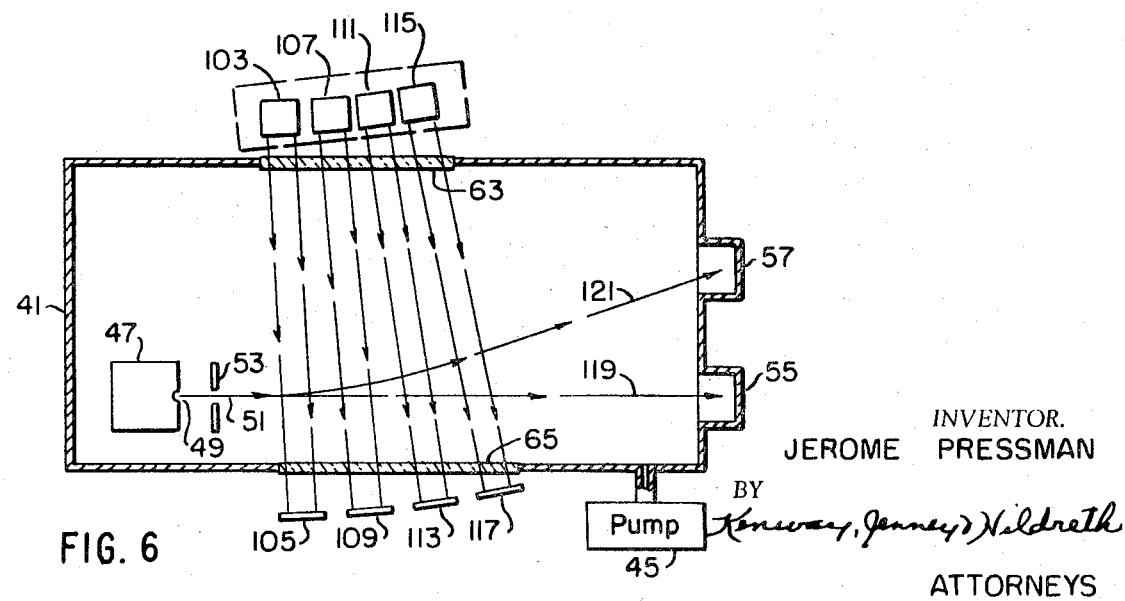
FIG. 6 is a diagrammatic sketch, with parts shown in cross section and parts broken away, of still another embodiment of my invention.

FIG. 6 shows another embodiment of my invention for increasing the total angle between the reflected beam and the unaffected beam. The apparatus is substantially the same as that shown in FIGS. 4 and 5, with the exceptions to be noted, and the corresponding parts have been given corresponding reference numerals. The apparatus is arranged to multiply the effect of the apparatus in FIG. 4 by the use of a plurality of progressively angularly displaced standing wave cavities each comprising a light source and a pair of mirrors. Thus, a light source 103 comprising a reflecting front surface is arranged to produce a standing wave with a mirror 105, a reflecting light source 107 produces a standing wave with a mirror 109, a reflecting light source 111 produces a standing wave with a mirror 113, and a reflecting light source 115 produces a standing wave with a mirror 117. The sets of sources and mirrors are progressively shifted in angular direction in respect to the angle of the molecular beam 51, such that Bragg reflection occurs in the region of intersection of each light beam with the molecular beam at a different angle with respect to the undeviated beam 119. The deviated beam of selected isotopic particles 121 is thereby given a deflection four times the deflection given the beam 71 in FIG. 4.

While I have described my invention with respect to the details of various illustrative embodiments thereof, many changes and variations will occur to those skilled in the art upon reading my description, and such can obviously be made without departing from the scope of my invention.

I claim:
1. The method of separating particles each having the property that it will absorb light at a wavelength λ from a mixture with other particles each having the property that it will not absorb light at the wavelength λ, comprising the steps of irradiating the mixture with a directed beam of light having the wavelength λ to selectively deflect said absorbing particles toward a predetermined location, and collecting said deflecting particles at said location.

2. The method of claim 1, in which the mixture of particles to be separated is formed into a beam moving along a predetermined axis inclined to the direction of propagation of said light beam, whereby the irradiated beam of particles is formed into a first stream of light-absorbing particles moving away from said predetermined axis and a second stream of nonabsorbing particles moving along said predetermined axis, and further comprising the step of collecting particles in said second stream at a location spaced from the path of propagation of said second stream.

3. The method of claim 2, in which said light beam is projected into a resonant optical cavity containing the region of intersection of said light beam and said particle beam, whereby a standing optical wave is produced and optically absorptive particles are directed into said first stream by Bragg reflection.

4. The method of claim 2, in which said optical beam is propagated through said particle beam in one direction, whereby optically absorptive particles are directed into said first stream by directional momentum transfer from photons in said optical beam.

5. The method of separating isotopes having differing optical absorption spectra, comprising forming a directed beam of a mixture of isotopes containing one isotope selectively absorbing light in a predetermined spectrum and at least one other isotope not absorbing light in said spectrum, irradiating said isotope beam with a beam of light in said spectrum to form a deflected beam enriched in said selectively absorbing isotope, and collecting particles from said deflecting beam.

6. The method of claim 5, in which the irradiation is accomplished by producing a standing wave of light having a wavelength in said spectrum across the path of the isotope beam.

7. The method of claim 2, in which the irradiation is accomplished by directing the beam of light across the path of the isotope beam, and in which the light beam is unidirectional.

8. Mass separation apparatus, comprising an evacuable chamber, a molecular beam source of particles to be separated connected to said chamber for emitting a particulate beam across said chamber, said particles including a species selectively absorbing light at a wavelength $\lambda$ and a species not absorbing light at the wavelength $\lambda$, means for directing a beam of light at the wavelength $\lambda$ obliquely across said particulate beam, and particle collection means mounted in spaced relation in said chamber, one collection means being mounted in the initial path of said particulate beam to collect nonabsorbing particles, and the other collection means being mounted out of the initial path of said particulate beam to collect deflected light-absorbing particles.

9. The apparatus of claim 8, in which said light directing means comprises an optical cavity resonant at the wavelength $\lambda$ formed by mirrors spaced on either side of said particulate beam, and means for supplying light said source to said cavity to provide a standing optical wave therein.

10. The apparatus of claim 8, in which said light directing means comprises an optical cavity resonant at $\lambda$ and including the region of intersection of said optical and particulate beams, said optical cavity comprising on one side a divergent lens and on the other side a curved mirror, whereby a standing wave is produced having at any point along said particulate beam an axis of propagation forming with the initial direction of the particulate beam an angle that decreases in the direction of propagation of said particulate beam.